United States Patent
Haupert et al.

(10) Patent No.: US 7,056,589 B2
(45) Date of Patent: *Jun. 6, 2006

(54) PLAIN BEARING COMPOSITE MATERIAL

(75) Inventors: Frank Haupert, Stelzenberg (DE); Wolfgang Bickle, Reilingen (DE)

(73) Assignee: KS Gleitlager GmbH, St. Leon-Rot (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/511,295

(22) PCT Filed: Jun. 5, 2003

(86) PCT No.: PCT/EP03/05886

§ 371 (c)(1),
(2), (4) Date: Oct. 15, 2004

(87) PCT Pub. No.: WO03/103954

PCT Pub. Date: Dec. 18, 2003

(65) Prior Publication Data

US 2005/0181194 A1  Aug. 18, 2005

(30) Foreign Application Priority Data

Jun. 7, 2002 (DE) ................ 102 26 266

(51) Int. Cl.
- B32B 15/08 (2006.01)
- B32B 5/02 (2006.01)
- B32B 5/16 (2006.01)
- B32B 27/18 (2006.01)
- B32B 27/04 (2006.01)

(52) U.S. Cl. .......... 428/460; 428/524; 428/297.4; 428/323

(58) Field of Classification Search .......... None
See application file for complete search history.

(56) References Cited

U.S. PATENT DOCUMENTS

| 4,394,275 | A | * | 7/1983 | Bickle et al. | 508/104 |
|---|---|---|---|---|---|
| 4,655,944 | A | * | 4/1987 | Mori | 428/545 |
| 4,666,787 | A | * | 5/1987 | Bickle et al. | 428/550 |
| 4,666,792 | A | * | 5/1987 | Bickle et al. | 428/626 |
| 4,812,367 | A | * | 3/1989 | Bickle | 428/332 |
| 4,847,135 | A | * | 7/1989 | Braus et al. | 428/138 |
| 4,867,912 | A | * | 9/1989 | Heinz et al. | 528/125 |
| 5,024,881 | A | * | 6/1991 | Matucha et al. | 428/323 |
| 5,024,882 | A | * | 6/1991 | Matucha et al. | 428/323 |
| 5,039,575 | A | * | 8/1991 | Mori et al. | 428/463 |
| 5,332,317 | A | * | 7/1994 | Niwa et al. | 384/548 |

(Continued)

FOREIGN PATENT DOCUMENTS

DE  20 49 184  4/1972

(Continued)

Primary Examiner—Deborah Jones
Assistant Examiner—Jason Savage
(74) Attorney, Agent, or Firm—Paul Vincent

(57) ABSTRACT

The invention relates to a plain bearing composite material with a metallic base layer, optionally with a porous support layer applied thereto and a lead-free bearing layer, forming a bearing surface for a bearing partner with a bearing surface material made from plastic with PEEK and a lubricant in the form of zinc sulfide and/or barium sulfate. The plain bearing composite material is characterised in that the bearing material comprises PEEK as matrix-forming plastic component and the lubricant is in the form of 3–15 wt. % zinc sulfide and/or barium sulfate and a hardening component in the form of 3–15 wt. % titanium dioxide and additionally 5–25 wt. % carbon fibers and 5–15 wt. % graphite particles.

9 Claims, 1 Drawing Sheet

U.S. PATENT DOCUMENTS

| | | | |
|---|---|---|---|
| 5,433,870 A * | 7/1995 | Nakamaru et al. | 508/104 |
| 5,643,683 A * | 7/1997 | Tanaka et al. | 428/551 |
| 5,889,102 A * | 3/1999 | Haack et al. | 524/494 |
| 5,971,617 A * | 10/1999 | Woelki et al. | 384/295 |
| 2004/0078977 A1 | 4/2004 | Kirchhof | |
| 2004/0115465 A1* | 6/2004 | Bickle et al. | 428/626 |
| 2004/0126041 A1* | 7/2004 | Bickle et al. | 384/276 |
| 2004/0142199 A1* | 7/2004 | Bickle et al. | 428/553 |

FOREIGN PATENT DOCUMENTS

| | | |
|---|---|---|
| DE | 24 06 361 | 8/1975 |
| DE | 32 21 785 | 1/1984 |
| DE | 36 01 569 | 7/1987 |
| DE | 37 36 292 | 5/1989 |
| DE | 44 30 474 | 3/1996 |
| GB | 2 229 234 | 9/1990 |

* cited by examiner

PLAIN BEARING COMPOSITE MATERIAL

This application is the national stage of PCT/EP03/05886 filed on Jun. 5, 2003 and also claims Paris Convention priority of DE 102 26 266.7 filed on Jun. 7, 2002.

BACKGROUND OF THE INVENTION

The invention concerns a sliding bearing composite material with a metallic support layer, an optional porous carrier layer disposed thereon, and a lead-free sliding layer which forms a sliding surface for a sliding partner, having a sliding layer material on the basis of plastic, with PEEK and a lubricant in the form of zinc sulfide and/or barium sulfate.

A sliding bearing composite material of this type is disclosed in DE 36 01 569 A1. This reference mentions PEEK as one of several polymers, although none of the embodiments comprises PEEK. The document teaches the use of 5–40 vol % of zinc sulfide and/or barium sulfide in the sliding layer material to increase wear resistance. It mentions additives, such as glass fibers, glass beads, carbon fibers, ceramic fibers and aramide fibers to increase stability. All embodiments include glass fibers or glass beads.

DE 37 36 292 A1 discloses a sliding layer film which can be separately produced and which can be applied either directly onto a metallic support layer or via an intermediate layer which serves as bonding agent. Suitable materials for the sliding layer are fluorinated plastic, in particular PTFE, modified PTFE, polyimide, or PEEK. None of the embodiments comprises PEEK. In accordance with this document, one or more fillers may be added to the sliding layer to increase and/or improve the thermal conductivity and/or wear properties. In particular carbon, aluminium oxide, ceramic materials, glass, bronze, molybdenum disulfide or silicon carbide can be embedded, in dependence on the application.

Sliding bearings of sliding bearing composite materials comprising a sliding layer on the basis of plastic are widely used in technology for the broadest of reasons, i.e. with regard to the loading capacity, chemical resistance and/or temperature resistance. Thermoplastic materials are known and available which guarantee thermal stability only for operating temperatures of up to approximately 90° C., which include e.g. ABS, high-pressure polyethylene (HD-PE), PVC, polysulfone (PS) etc. There are also a number of so-called technical thermoplastic materials which are suitable for operating temperatures of up to approximately 150° C., such as e.g. POM, PET, PA.

The present invention concerns such sliding bearing composite materials which are suitable for use at continuous operating temperatures of more than 180° C. They should also have very good tribological properties and favorable characteristic mechanical values with regard to shapability as well as high resistance to chemicals. The sliding bearing composite materials must moreover be suited for manufacture in an industrial production process.

These objects are achieved by a sliding bearing composite material having the features of the independent claim.

SUMMARY OF THE INVENTION

The sliding bearing composite material comprising polyetherether ketone (PEEK) as matrix-forming plastic component, in connection with the other claimed components. It is stable at high temperatures, i.e. it can be used on a continuous basis at temperatures of more than 180° C., e.g. 190 to 250° C. Polyphenylene sulfone (PPS) would, in principle, be suitable as a matrix-forming plastic component of a sliding layer material in view of its temperature stability of up to 260° C. However, PPS forms an inadequate matrix in view of its retaining capacity, as it tends to burst open during shaping and furthermore does not meet the tribological performance of PEEK.

The present invention does not exclude one or more further thermoplastic materials from being contained in the sliding layer material in addition to PEEK as a matrix-forming plastic component. Their portion should not exceed 20 weight %, in particular 10 weight % of the portion of the plastic component in the sliding layer material. The plastic component is preferably 100% PEEK.

A sliding layer material is e.g. available which contains PEEK as a matrix-forming plastic component, 10 weight % of carbon fibers, 10 weight % of PTFE, and 10 weight % of graphite. A sliding bearing composite material having a porous carrier layer and comprising the conventional sliding layer material which is introduced into the pores of the carrier layer does not have high-temperature stability. Measurements of the specific wear rate on a pin-on-disk wear test bench showed a total failure of the sliding bearing composite material with conventional sliding layer material at temperatures of 150° C., whereas the inventive sliding layer material comprising 3 to 15 weight %, in particular 5 to 15 weight % of zinc sulfide as lubricant and 3 to 15 weight %, in particular 5 to 10 weight % of titanium dioxide as hardening component and 5 to 15 weight % of carbon fibers showed excellent results. Although the coefficient of friction of the conventional sliding layer material is highly satisfactory per se, even at high temperatures, this material rapidly wears at high temperatures of more than 150° C.

Figure 1:
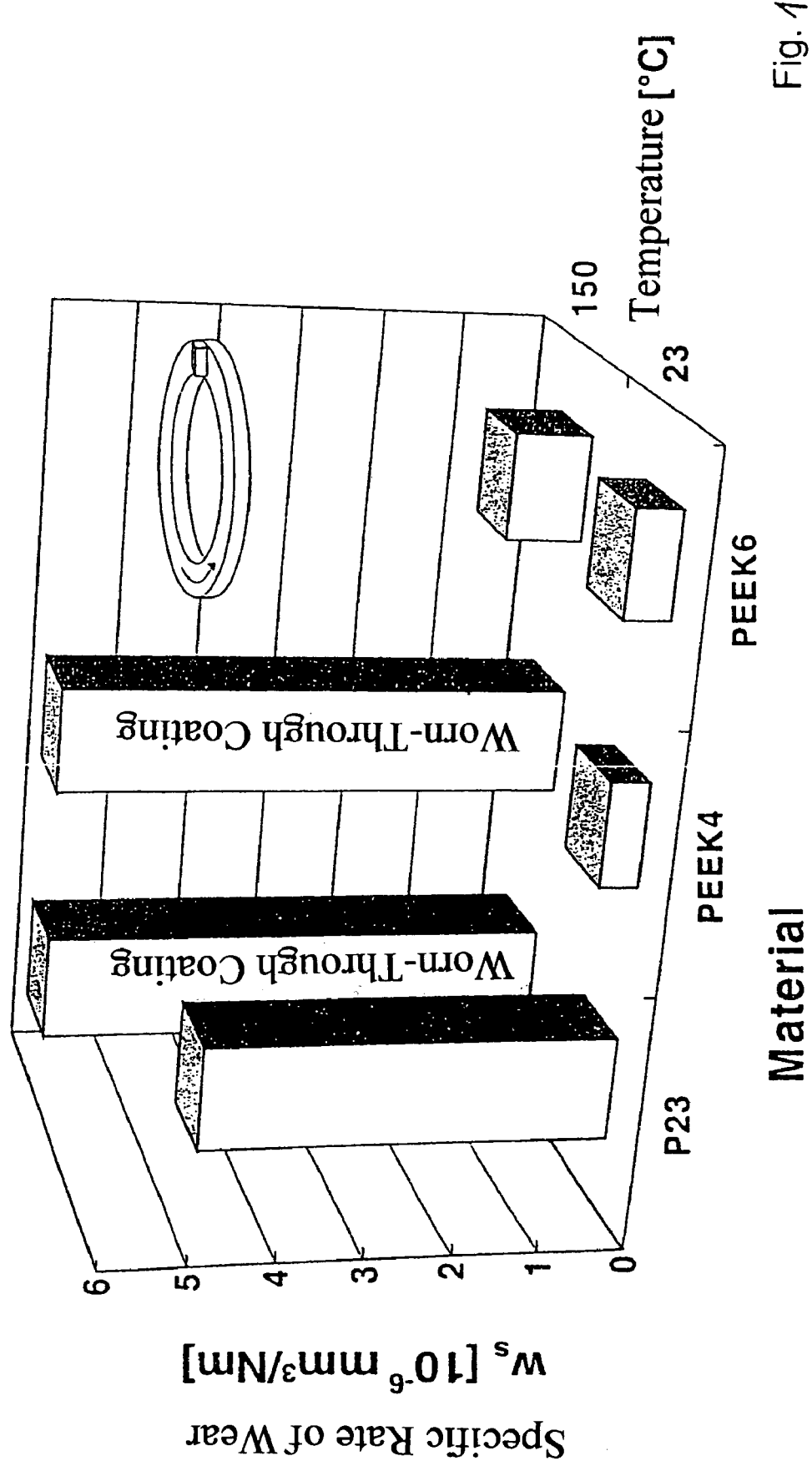
FIG. 1 shows results of wear tests for materials in accordance with the invention The specific wear rate which is improved compared to the conventional material is due to the addition of 3 to 15 weight %, in particular 5 to 15 weight %, of the titanium dioxide hardening component. This hardening component is preferably selected in the form of fine particles with a D50 value of the particle size of maximally 500 nm, preferably maximally 400 nm, and in particular of 100 to 350 nm, to prevent negative influence on the coefficient of friction. The above-mentioned D50 value of the particle size designates a particle size, with which 50 weight % of the relevant material have a larger particle size and 50 weight % have a smaller particle size compared thereto. Since the clogging lubricant particles and the particles of the hardening component in the form of titanium dioxide are powdery particles which are to be produced in the technical method or sorted in accordance with technical methods, the curve of the particle size distribution will usually be bell-shaped: an approximately normal distribution. The D50 value of the particle size will then be close to the maximum of the bell-shaped distribution curve. In accordance with the present invention, the bell-shaped distribution curve is preferably such that at least 60%, in particular at least 70%, and most preferably at least 80 weight % of the relevant substance has a particle size within a particle size range about the bell maximum, or about the D50 value, of ±50%. For a D50 value of 330 nm, this corresponds to a particle size range of 330 nm±165 nm, i.e. of 165 nm to 495 nm.

Moreover, it has proven to be suitable if the particle size distribution is such that the sum residue in weight % for a screen analysis with varying mesh width t, in particular between 1 μm and 100 nm can be described by the following relationship:

$$S = 100 \cdot e^{-(t/d)^\beta}$$

wherein, in a particularly advantageous manner, the characteristic grain size d is between 0.34 and 0.54 μm and the forming parameter β of the distribution is between 2.4 and 3.4. A preferred distribution is distinguished by a characteristic grain size of 0.440 μm (440 nm) and a forming parameter β of 2.87.

Moreover it has turned out that, in the inventive sliding bearing composite material, the addition of PTFE, which is contained in conventional sliding materials in an amount between 2 and 15 weight %, can be omitted even under extreme load conditions. It is assumed that the influence of PTFE on the tribological properties of a material composition which is desired per se, is substituted by the claimed component zinc sulfide and the alternatively or additionally claimed barium sulfate component.

The addition of carbon fibers reinforces the sliding layer of the sliding bearing composite material by increasing its rigidity and solidity as well as its creeping strength. Carbon fibers also increase the wear resistance. The thermal conductivity, which is of particular importance, is also improved by the addition of carbon fibers to the sliding layer. These fibers prevent overheating of the sliding layer by discharging the frictional heat, which is generated during operation directly on the surface of the sliding layer, to the inside of the sliding bearing composite material, in particular, to the metallic component of an optionally provided porous carrier layer or directly to the metallic support layer.

In accordance with a preferred embodiment of the invention, the carbon fibers are advantageously short fibers of a length of between 50 and 250 μm, in particular 60 to 150 μm. It has turned out that in this case, homogeneous distribution of the carbon fibers in the sliding layer material is also obtained within the pores of the optionally provided porous carrier layer. This further improves the thermal conductivity by effectively discharging the produced heat to the porous carrier layer. If the carbon fibers have the cited length, they can be introduced into the pores of the optionally provided porous carrier layer. This is difficult with fibers of greater length, and such carbon fibers are therefore mostly constrained to the sliding layer above the carrier layer, making dissipation of heat often insufficient in this case.

In view of homogeneous distribution of the lubricant, it is advantageous to provide the lubricant, i.e. zinc sulfide and/or barium sulfate in the form of fine particles with a D50 value of the particle size of maximally 500 nm, preferably maximally 400 nm and, in particular, 100–350 nm.

The graphite particles should preferably be present as fine particles of a particle size of maximally 15 μm, in particular 1–10 μm and preferably 1–5 μm.

To explain the improved temperature stability of the inventive material, reference is made below to the measuring results of the specific wear rate on a pin-on-disk wear test bench in accordance with FIG. 1.

The figure shows an arrangement, wherein the sliding bearing composite material is formed by the indicated pin which slides against a sliding annular counter body of 100 Cr6, $R_a$=0.1 to 0.2 μm with a surface pressure of 0.5 MPa. The sliding speed was 1.57 m/sec. A dry run, i.e. without lubricant, was tested. The test duration was 20 hours. Testing was carried out at two test temperatures, i.e. 230 and 150° C.

A first comparable material designated with P23 comprises a sliding layer material with PVDF as matrix-forming plastic component into which lead and PTFE are embedded as lubricant. A sliding bearing composite material with a sliding layer of a known sliding layer material of the above-mentioned type with a matrix of PEEK and 10 weight % of carbon fibers, 10 weight % of PTFE and 10 weight % of graphite was examined.

This sliding bearing composite material is designated as PEEK4. Finally, an inventive material (PEEK6) was tested whose matrix was formed from PEEK, comprising 10 weight % of ZnS, 10 weight % of carbon fibers, 10 weight % of graphite and 10 weight % of $TiO_2$. The above-mentioned weight percentages each refer to the overall mass of the sliding layer material. ZnS and $TiO_2$ were present in a particle size distribution with a D50 value of approximately 300 nm. The respective sliding bearing composite material comprised a metallic support layer of steel and a porous carrier layer of bronze disposed thereon, into the pores of which the sliding layer material forming the sliding layer was introduced to extend above this carrier layer.

Determination of the specific wear rate during a test period of 20 hours showed total wear of the conventional materials P23 and PEEK4: their sliding layer and the porous carrier layer were completely abraded down characterized by an excellent specific wear rate of less than $1 \times 10^{-6} mm^3/Nm$.

It has also turned out that the inventive sliding layer material shows excellent adhesion to a metallic support layer. The porous carrier layer may consequently be omitted.

The invention also concerns a method for producing a sliding bearing composite material in accordance with claim 1, wherein the inventive method comprises the method steps recited in claim 7. Extrusion of the plastic sliding material into a thin strip shape, application of the strip onto the heated carrier strip produce substantial advantages. It has turned out that, in this manner, the plastic sliding material can be introduced into the pores of the porous carrier layer without previous grinding.

We claim:

1. A sliding bearing composite material comprising:
   a metallic support layer; and
   a lead-free sliding layer forming a sliding surface for a sliding partner, said sliding layer comprising PEEK as a matrix-forming plastic component, 3–15 weight % of zinc sulfide and/or barium sulfate as a lubricant, a hardening component of 3–15 weight % titanium dioxide, 5–25 weight % carbon fibers, and 5–15 weight % graphite particles.

2. The sliding bearing composite material of claim 1, further comprising a porous carrier layer disposed on said metallic support layer.

3. The sliding bearing composite material of claim 1, wherein said lubricant is present in the form of fine particles with a D50 particle size value of at most 500 nm.

4. The sliding bearing composite material of claim 3, where said D50 particle size is at most 400 nm.

5. The sliding bearing composite material of claim 1, wherein said hardening component is present in a form of fine particles with a D50 particle size value of maximally 500 nm.

6. The sliding bearing composite material of claim 5, wherein said hardening component D50 particle size value is maximally 400 nm.

7. The sliding bearing composite material of claim 1, wherein said carbon fibers have a length of 50–250 μm.

8. The sliding bearing composite material of claim 7, wherein said carbon fibers have a length of 60–150 μm.

9. The sliding bearing composite material of claim 1, wherein said carbon fibers have a thickness of 8–15 μm.

* * * * *